United States Patent
Kim

(12) 
(10) Patent No.: US 8,029,926 B2
(45) Date of Patent: Oct. 4, 2011

(54) RECHARGEABLE BATTERY WITH PTC DEVICE

(75) Inventor: Jun Ho Kim, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 61 days.

(21) Appl. No.: 11/458,421

(22) Filed: Jul. 19, 2006

(65) Prior Publication Data
US 2007/0020509 A1 Jan. 25, 2007

(30) Foreign Application Priority Data
Jul. 25, 2005 (KR) .................. 10-2005-0067192

(51) Int. Cl.
*H01M 10/50* (2006.01)
(52) U.S. Cl. .................. 429/62; 429/231.95; 429/180; 338/221
(58) Field of Classification Search .............. 429/56, 429/57, 231.95, 180, 163, 62; 439/181, 157; 338/22 R, 221
See application file for complete search history.

(56) References Cited

U.S. PATENT DOCUMENTS

| | | | | |
|---|---|---|---|---|
| 5,985,479 | A | * | 11/1999 | Boolish et al. .................. 429/56 |
| 6,114,942 | A | * | 9/2000 | Kitamoto et al. ............ 338/22 R |
| 6,659,783 | B2 | * | 12/2003 | Copper et al. ................. 439/181 |
| 6,861,821 | B2 | | 3/2005 | Masumoto et al. |
| 6,936,374 | B2 | | 8/2005 | Ehara |
| 2004/0137314 | A1 | * | 7/2004 | Fukui ............... 429/62 |
| 2005/0079422 | A1 | * | 4/2005 | Ko et al. .................. 429/231.95 |
| 2005/0089753 | A1 | * | 4/2005 | Yoon ............................. 429/180 |

FOREIGN PATENT DOCUMENTS

| | | |
|---|---|---|
| CN | 1197534 | 10/1998 |
| CN | 1380713 | 11/2002 |
| CN | 1465109 | 12/2003 |
| CN | 1519963 | 8/2004 |
| JP | 07057721 A * | 3/1995 |
| JP | 2004-127617 | 4/2004 |

OTHER PUBLICATIONS

"Bolinger Heating and Air Glossary." Bolinger Heating and Air Conditioning. 2008. Bolinger Heating and Air Conditioning. Jun. 12, 2008 <http://www.bolingerhvac.com/glossary.html>.*

* cited by examiner

*Primary Examiner* — Barbara Gilliam
*Assistant Examiner* — Zachary Best
(74) *Attorney, Agent, or Firm* — H.C. Park & Associates, PLC

(57) ABSTRACT

A rechargeable battery includes a PTC device including a cover member provided on the surface of the PTC body to prevent high-temperature hot-melt resin from making direct contact with the surface of the PTC body when the battery pack is being fabricated and to provide a space to allow the PTC body to expand during the operation of the PTC device.

12 Claims, 3 Drawing Sheets

RECHARGEABLE BATTERY WITH PTC DEVICE

CROSS REFERENCE TO RELATED APPLICATION

This application claims priority to and the benefit of Korean Patent Application No. 2005-0067192, filed Jul. 25, 2005 which is hereby incorporated by reference for all purposes as if fully set forth herein.

BACKGROUND OF THE INVENTION

1. Field of the Invention

The present invention relates to a rechargeable battery. More particularly, the present invention relates to a rechargeable battery including a positive temperature coefficient (PTC) device that includes a cover member arranged on a surface of the PTC body.

2. Discussion of the Background

A rechargeable battery may be reused by repeating charging and discharging operations. Rechargeable batteries may be used in advanced electronic appliances, such as cellular phones, notebook computers, and camcorders.

Lithium rechargeable batteries may provide an operational voltage of about 3.6 V, which is about three times higher than that of Ni—Cd batteries or Ni—MH batteries. In addition, lithium rechargeable batteries may have a high energy density per unit weight, and are therefore extensively used in advanced electronic technology fields.

Lithium rechargeable batteries may use lithium-based oxides as positive electrode active materials and carbon as negative electrode active materials. Lithium rechargeable batteries may be fabricated with various shapes, such as cylinders, rectangles, and pouches.

Rechargeable batteries may include a bare cell, a protective circuit module including protective circuits, a PTC device aligned between the protective circuit module and the bare cell, and molding resin arranged in the space formed between the protective circuit module and the bare cell. The bare cell may include a can, an electrode assembly accommodated in the can, and a cap assembly coupled with the can.

In addition, safety devices, such as a PTC device, a thermal fuse, and a protective circuit module, may be installed at an outer portion of the can. The safety devices may be connected to the positive and negative electrode terminals of the bare cell. The safety devices may shut off the current in the battery if the voltage of the rechargeable battery suddenly rises due to increased temperature, overcharging, or over-discharging the battery.

FIG. 1 is a partial perspective view illustrating a rechargeable battery equipped with a conventional PTC device 170.

A PTC device 170 is a reversible safety device that is capable of stopping or reducing the current that flows through it when the internal temperature of the rechargeable battery rises above a predetermined temperature due to a malfunction of the rechargeable battery.

Referring to FIG. 1, the conventional PTC device 170 of the rechargeable battery may include a PTC body 174 having a cylindrical structure with flat upper and lower surfaces, a first conductive section 172 coupled with an upper surface of the PTC body 174 and coupled with a negative or positive electrode, and a second conductive section 176 coupled with a lower surface of the PTC body 174 and coupled with a terminal 220 that is used to make contact with an external device. An insulating member 185 may be interposed between and the PTC device 170 and the cap plate 110 to prevent a short circuit between the can 11 and the PTC device 170 because the can 11 may have a polarity opposite to that of the PTC device 170.

The PTC body 174 may be made of conductive particles distributed into crystalline polymer. Current may therefore flow through the PTC body 174 so long as the internal temperature of the rechargeable battery remains less than a predetermined temperature. If the internal temperature of the rechargeable battery exceeds the predetermined temperature, the PTC body 174 will expand to increase the distance between the conductive particles and thus stop or reduce the current that flows through it. This may stop the battery from exploding or being otherwise damaged. In addition, if the internal temperature of the rechargeable battery drops below the predetermined temperature, the crystalline polymer shrinks, so the conductive particles combine together and the current is able to flow through the PTC body 174 again.

However, a conventional PTC device 170 may be damaged during the manufacturing process when hot-melt resin, such as an epoxy-molding compound, is injected into the space between the protective circuit module and the cap plate. When the hot-melt resin cools, the PTC body 174 may shrink and the expansion of the PTC body 174 may be hindered due to the hard resin encasing the PTC body 174. Therefore, the PTC device 170 may not stop or reduce the current at the predetermined temperature. The battery may therefore continue to operate even when the internal temperature reaches dangerous levels.

Furthermore, if the PTC body 174 is cooled after directly contacting the hot-melt resin at a temperature of about 200° C., the trip phenomenon may occur in the PTC body 174, thereby causing the conductive articles uniformly distributed in the PTC body 174 to be partially biased and may thus result in resistance dispersion. The PTC device 170 may then operate at a temperature that is different form the original predetermined temperature.

SUMMARY OF THE INVENTION

This invention provides a rechargeable battery including a PTC device that includes a cover member arranged on a surface of a PTC body to prevent hot-melt resin from making direct contact with the surface of the PTC body during the manufacturing process.

Additional features of the invention will be set forth in the description which follows, and in part will be apparent from the description, or may be learned by practice of the invention.

The present invention discloses a rechargeable battery, including a bare cell including an electrode assembly arranged in a can and a cap assembly coupled with an opening arranged at an upper portion of the can; a protective circuit module; a positive temperature coefficient device including a first conductive section electrically coupled with one electrode of the bare cell, a second conductive section electrically coupled with the protective circuit module, a positive temperature coefficient body arranged between the first conductive section and the second conductive section, and a cover member covering at least a portion of a surface of the positive temperature coefficient body; and molding resin arranged in a space between the protective circuit module and the bare cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
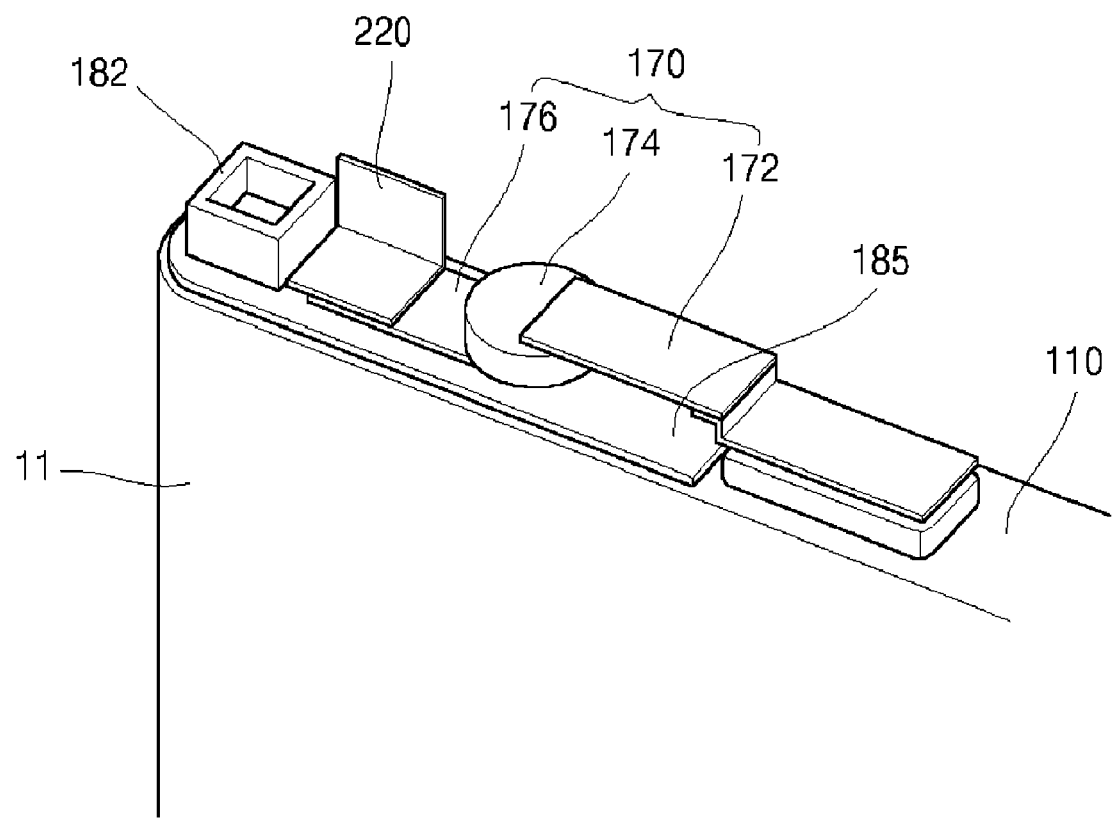
FIG. 1 is a partial perspective view illustrating a rechargeable battery that includes a conventional PTC device.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2:
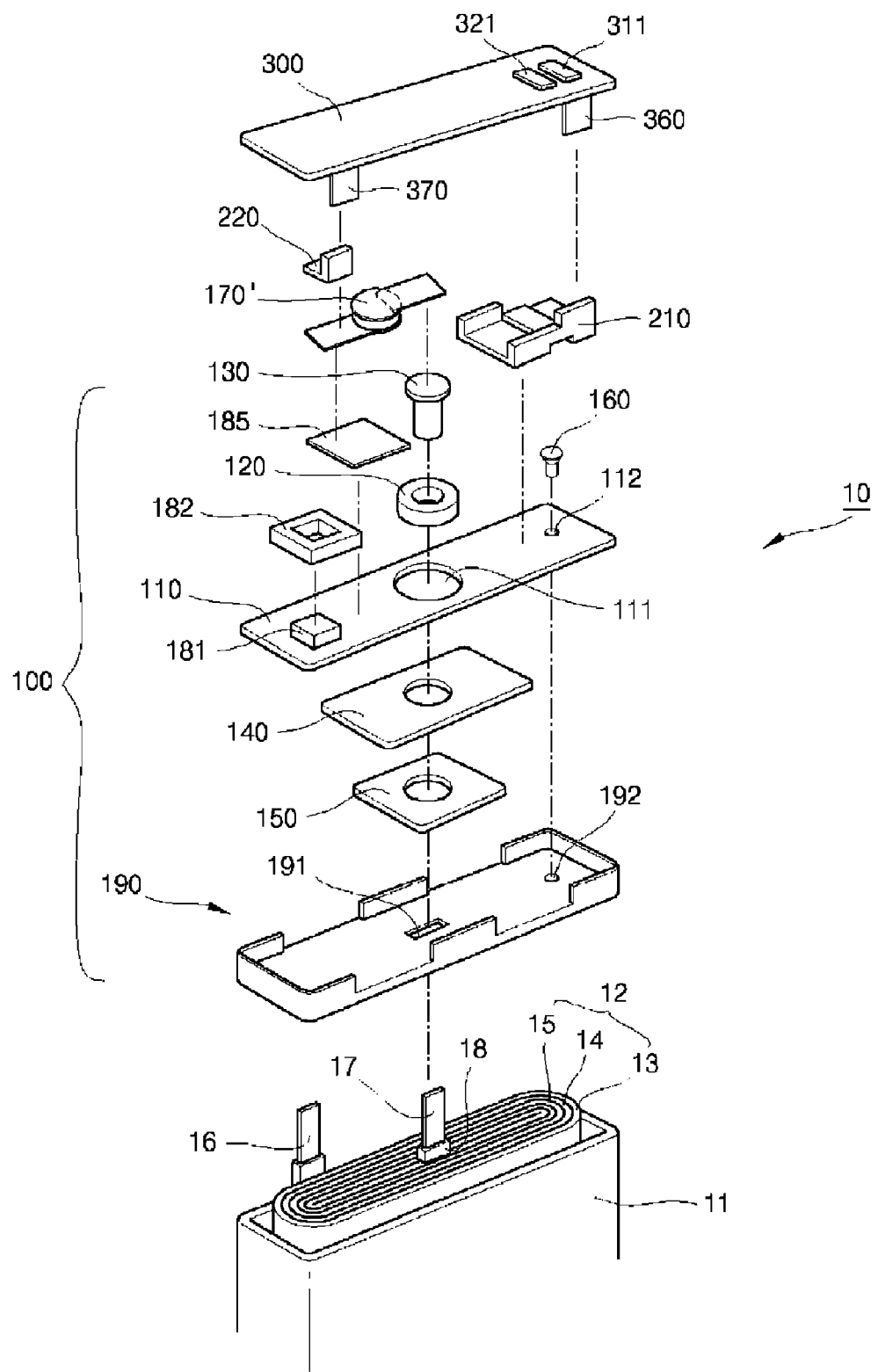
FIG. 2 is an exploded perspective view illustrating a rechargeable battery according to an exemplary embodiment of the present invention.

FIG. 2 is an exploded perspective view illustrating a rechargeable battery according to an exemplary embodiment of the present invention.

Referring to FIG. 2, the rechargeable battery 10 may include a bare cell, a protective circuit module 300 including protective circuits, a PTC device 170' arranged between the protective circuit module 300 and the bare cell, and molding resin arranged in the space between the protective circuit module 300 and the bare cell.

The bare cell may include an electrode assembly 12, a can 11 to contain the electrode assembly 12, and a cap assembly 100 coupled with the can 11.

The electrode assembly 12 may include plate-shaped positive and negative electrodes 13 and 15. The plate shape may increase electric capacity. A separator 14 may be interposed between the positive and negative electrodes 13 and 15 to insulate the positive electrode 13 from the negative electrode 15. The positive electrode 13, the separator 14, and the negative electrode 15 may be sequentially stacked and wound in the form of a jellyroll. The negative electrode 15 may be manufactured by coating negative electrode active materials, such as carbon, onto a negative electrode collector made of copper foil. The positive electrode 13 may be manufactured by coating positive electrode active materials, such as $LiCoO_2$, onto a positive electrode collector made of aluminum foil. The separator 14 may include polyethylene, polypropylene or a copolymer of polyethylene and polypropylene. The separator 14 may be wider than the positive and negative electrodes 13 and 15 to prevent a short circuit between the positive and negative electrodes 13 and 15. Positive and negative electrode taps 16 and 17 may be coupled with the positive and negative electrodes 13 and 15 and may extend upward from the electrode assembly 12. Insulating tapes 18 may be wound around the positive and negative electrode taps 16 and 17 at boundary areas between the positive and negative electrode taps 16 and 17 and the electrode assembly 12 to prevent a short circuit between the positive and negative electrodes 13 and 15.

The can 11 for a square type secondary battery may be a metallic container with a substantially hexahedral structure manufactured using a deep drawing process. The can 11 may be made from a conductive metal with lightweight properties, such as aluminum or an aluminum alloy and may serve as a terminal. The can 11 may accommodate the electrode assembly 12 and an electrolyte therein. The can 11 may include an opening at an upper portion to receive the electrode assembly 12. The opening may be closed by the cap assembly 100.

The cap assembly 100 may include a cap plate 110, an electrode terminal 130, and a holder 182. The cap plate 110 may include a terminal hole 111 through which the electrode terminal 130 may pass. A gasket 120 may be arranged around the electrode terminal 130 to insulate the electrode terminal 130 from the cap plate 110.

An insulating plate 140 may be arranged below the cap plate 110 and a terminal plate 150 may be arranged below the insulating plate 140. A lower end portion of the electrode terminal 130 may be coupled with the terminal plate 150. The negative electrode 15 of the electrode assembly 12 may be electrically coupled with the electrode terminal 130 through the negative electrode tap 17 and the terminal plate 150. The positive electrode tap 16 may be welded to the cap plate 110 or the can 11. An insulating case 190 may be installed below the terminal plate 150. The insulating case 190 may have a lead through-hole 191 formed at its center and an electrolyte through-hole 192 formed on its side. The polarities of the positive and negative electrodes may be reversed.

An electrolyte injection hole 112 may be arranged at one side of the cap plate 110 to allow an electrolyte to be injected into the can 11. After the electrolyte has been injected into the can 11, the electrolyte injection hole 112 may be sealed by a plug 160 or a ball. The holder 182 may be installed at the other side of the cap plate 110 on a protrusion 181 to enhance the strength of molding resin against a twisting or bending force applied thereto.

Safety devices, including a PTC device 170' and a protective circuit module 300, may be installed at an outer portion of the can 11. The safety devices may be connected to the positive and negative electrode terminals of the rechargeable battery to stop or reduce the current when the voltage of the rechargeable battery rises suddenly due to high temperature or overcharging or over-discharging of the rechargeable battery to prevent the rechargeable battery from being damaged. The protective circuit board may include external terminals 311 and 321 to connect the battery to a charger or electronic devices and electrical terminals 360 and 370. The electrical terminal 360 may be coupled to a plate 210.

The molding resin filled in the space between the protective circuit module 300 and the bare cell using a hot-melting process may serve as a support structure against external bending forces or impacts.

Figure 3:
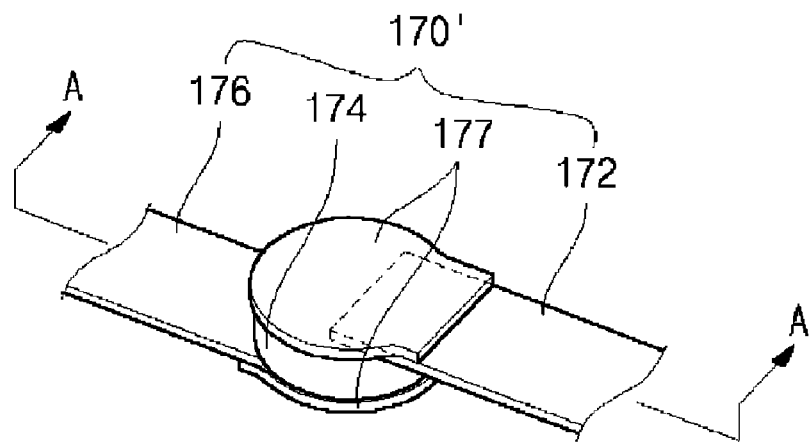
FIG. 3 is an exploded perspective view illustrating a PTC device of a rechargeable battery according to an exemplary embodiment of the present invention.
Figure 4:
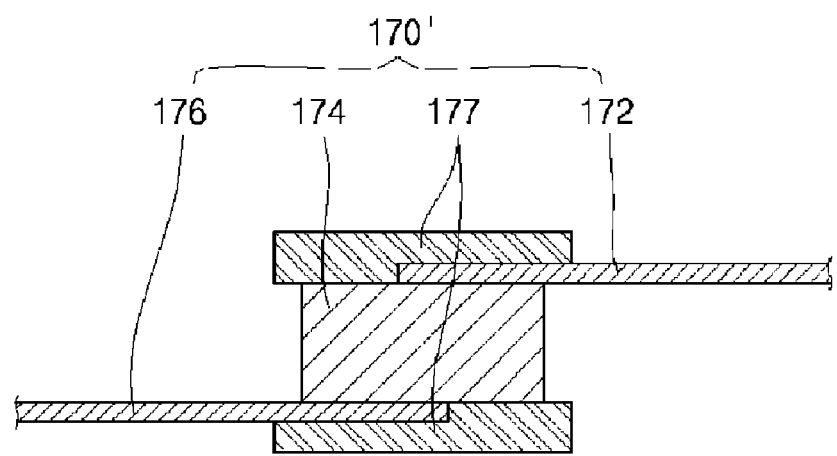
FIG. 4 is a sectional view taken along line A-A of FIG. 3.

FIG. 3 is an exploded perspective view illustrating the PTC device 170' of the rechargeable battery according to an exemplary embodiment of the present invention. FIG. 4 is a sectional view taken along line A-A of FIG. 3.

Referring to FIG. 3 and FIG. 4, the PTC device 170' may include a first conductive section 172 electrically coupled with one electrode of a bare cell, a second conductive section 176 electrically coupled with the protective circuit module, a PTC body 174 that couples the first conductive section 172 to the second conductive section 176, and cover members 177 surrounding upper and lower surfaces of the PTC body 174.

As shown in FIG. 3, the first conductive section 172 may contact part of the upper surface of the PTC body 174 and one end portion of the second conductive section 176 may contact part of the lower surface of the PTC body 174. The other end portion of the second conductive section 176 may be electrically coupled with a terminal (not shown) connected to an external device.

Alternatively, the first and second conductive sections 172 and 174 may be connected to left and right portions of the PTC body, respectively.

According to another exemplary embodiment of the present invention, the first conductive section may be omitted and the cap plate or the electrode terminal may serve as the first conductive section. In this case, the cap plate or the electrode terminal may be electrically coupled with one electrode of the electrode assembly.

Although a PTC body 174 having a cylindrical structure is illustrated in FIG. 3, the PTC body 174 may have other various shapes.

The PTC body 174 may be made of conductive particles distributed into crystalline polymer. The conductive particles may include metallic particles, such as nickel powder, or carbon particles. The crystalline polymer may include synthetic resin, such as polyethylene resin or polyolefin-based resin.

In addition, each cover member 177 may include a movable damping member and/or an internal space section. The cover member 177 may prevent the PTC body 174 from making direct contact with hot-melt resin (not shown) when a hot-melting process is performed to fabricate the battery pack. The cover member 177 may thus prevent the PTC body 174 from shrinking when the hot-melt resin is cooled and may thus prevent the trip phenomenon.

The PTC device 170' may further include an anti-oxidation coating layer (not shown) arranged on the surface of the PTC body 174. The cover member 177 may surround the anti-oxidation coating layer to prevent the hot-melt resin from making direct contact with the anti-oxidation coating layer to prevent the anti-oxidation coating layer from being deformed or moved.

The internal space section in the cover member 177 may allow the PTC body 174 to sufficiently expand when the PTC device 170' operates normally. The damping member attached to the surface of the PTC body 174 may also allow the PTC body 174 to sufficiently expand when the PTC device 170' operates normally. The damping member may include an elastic member, such as an adhesive tape or a double-sided tape. If a double-sided tape is used, one side of the double-sided tape may be bonded to the PTC body 174 and the second conductive section 176 and the other side of the double-sided tape may be bonded to the insulating member, thereby fixing the PTC device 170' (FIG. 2).

The cover member 177 may surround the entire surface of the PTC body 174, only the upper and lower surfaces of the PTC body 174, or only the upper surface of the PTC body 174.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
a bare cell comprising an electrode assembly arranged in a can and a cap assembly coupled with an opening arranged at an end portion of the can;
a protective circuit module;
a positive temperature coefficient device comprising an integrally formed first conductive section contacting one electrode of the bare cell, an integrally formed second conductive section contacting the protective circuit module, a positive temperature coefficient body arranged between and contacting the first conductive section and the second conductive section, and a cover member covering at least a portion of a surface of the positive temperature coefficient body, wherein the second conductive section is formed separate from the first conductive section; and
molding resin arranged in a space between the protective circuit module and the bare cell,
wherein the cover member prevents the molding resin from directly contacting a portion of the positive temperature coefficient body,
wherein the cover member comprises a movable damping member,
wherein the first conductive section contacts a portion of a first surface of the positive temperature coefficient body,
wherein the second conductive section contacts a portion of a second surface of the positive temperature coefficient body, which is opposite the first surface of the positive temperature coefficient body, and is arranged opposite to the first conductive section,
wherein the second surface faces the bare cell,
wherein the cover member covers an entire first surface of the positive temperature coefficient body, the entire first surface facing the protective circuit module, and
wherein another portion of the positive temperature coefficient body makes direct contact with the molding resin.

2. The rechargeable battery of claim 1,
wherein the cover member covers an entire second surface of the positive temperature coefficient body, which is opposite the first surface of the positive temperature coefficient body.

3. The rechargeable battery of claim 1,
wherein the damping member comprises an elastic member.

4. The rechargeable battery of claim 3,
wherein the elastic member is an adhesive tape or a double-sided tape.

5. The rechargeable battery of claim 1,
wherein the cover member comprises an internal space section.

6. The rechargeable battery of claim 1,
wherein the positive temperature coefficient device further includes an anti-oxidation coating layer arranged on the surface of the positive temperature coefficient body.

7. The rechargeable battery of claim 1,
wherein the positive temperature coefficient body comprises conductive particles distributed into crystalline polymer.

8. The rechargeable battery of claim 7,
wherein the conductive particles comprises metallic particles or carbon particles.

9. The rechargeable battery of claim 7,
wherein the crystalline polymer comprises polyethylene resin or polyolefin-based.

10. The rechargeable battery of claim 1,
wherein the cover member contacts the positive temperature coefficient body.

11. The rechargeable battery of claim 10, wherein the cover member contacts a surface of the positive temperature coefficient body that is in contact with the first conductive section or the second conductive section.

12. The rechargeable battery of claim 1, wherein the first surface of the positive temperature coefficient body is coplanar with the electrode of the bare cell such that the first conductive section is flat and planar.

* * * * *